United States Patent [19]

Spoetzl

[11] Patent Number: 4,871,492
[45] Date of Patent: Oct. 3, 1989

[54] METHOD FOR ALIGNING BLOW MANDREL

[75] Inventor: Markus Spoetzl, Munich, Fed. Rep. of Germany

[73] Assignee: Krauss-Maffei A.G., Fed. Rep. of Germany

[21] Appl. No.: 68,331

[22] Filed: Jul. 1, 1987

[30] Foreign Application Priority Data

Jul. 9, 1986 [DE] Fed. Rep. of Germany ....... 3623099

[51] Int. Cl.$^4$ ...................... B29C 49/50; B29C 49/58; B29C 49/74
[52] U.S. Cl. ...................................... 264/39; 264/533; 264/536; 264/540; 425/425; 425/527; 425/535
[58] Field of Search ............... 425/522, 525, 527, 528, 425/531, 535, 536; 264/533, 39, 238, 349, 540, 536

[56] References Cited

U.S. PATENT DOCUMENTS 3,907,475  9/1975  Bowers ............................... 425/535

FOREIGN PATENT DOCUMENTS 8201332  6/1982  Fed. Rep. of Germany .

OTHER PUBLICATIONS

"Das Blaswerkzeug," VDI-Verlag (Press), 1984, pp. 77–78.

Primary Examiner—Jan H. Silbaugh
Assistant Examiner—Neil M. McCarthy
Attorney, Agent, or Firm—Robert J. Koch

[57] ABSTRACT

On the sizing unit of a blow molding machine, one or more blow mandrels are mounted in blow mandrel holders and are centered in sizing plate openings. To obtain faster and more accurate centering, the blow mandrel holder has independently adjustable sleeve and flange parts. The sleeve adjusts axial location while the flange fixes radial location. Conical mandrel tips and sizing plate openings facilitate rapid alignment as the blow mandrels are lowered.

4 Claims, 3 Drawing Sheets

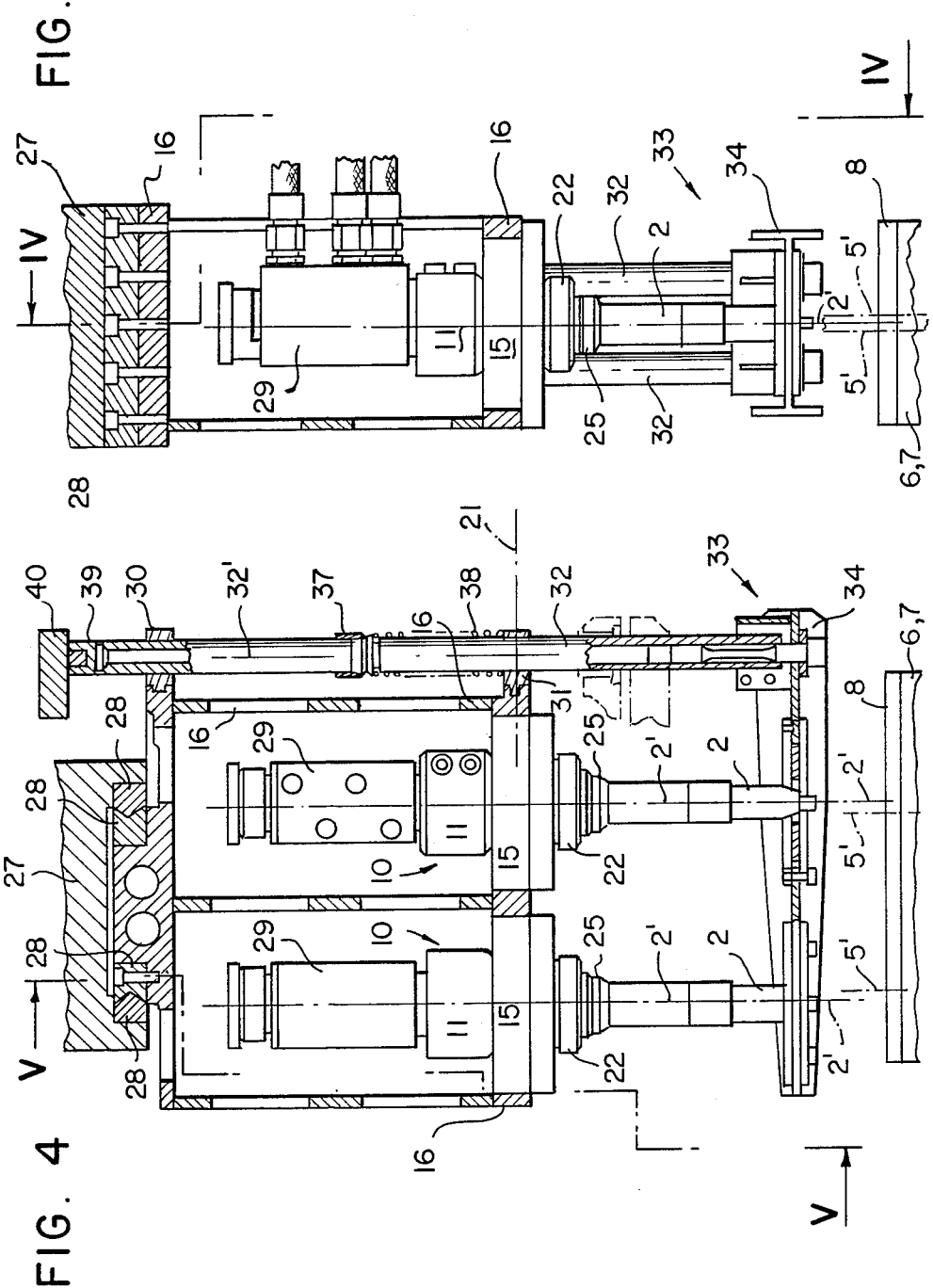

METHOD FOR ALIGNING BLOW MANDREL

BACKGROUND OF THE INVENTION

The invention relates to a blow molding machine readily adjustable for a variety of molds.

At the sizing station of a blow molding machine, the blow mandrel has a cutting sleeve and rises and descends for sizing. Precise placement is needed so that upon its descent into the sizing plate opening, the sleeve smoothly cuts a uniform wall thickness in the parison neck. These requirements must be satisfied if several blow mandrels are arranged on one sizing unit which must be lowered into several sizing plate openings. Both in the case of single blow mandrel and with several blow mandrels on one sizing unit, time consuming adjusting work is required to match the mandrel to the appropriate opening.

DESCRIPTION OF RELATED TECHNOLOGY

The literature, "Das Blaswerkzeug", VDI-Verlag (Press) 1984, pages 77 and 78, carries out the fine adjustments for one or several blow mandrels transversely to and along the tool parting plane by using rapid action toggle clamps. Scales and indicators are used in both directions so that the settings may be carried out in a reproducible manner. This type of calibration method is very time consuming.

The adjustment process necessitates frequent checking and adjusting. Also, no precise coordinates can be obtained using scales and indicators. The scales permit only relatively coarse settings, and the blow machine and the mobile sizing station elements may experience deviations from the overall setting during operation.

SUMMARY OF THE INVENTION

It is an object of the invention to develop a blow molding machine having more accurate mandrel settings and obtained with shorter calibration times.

This objective is achieved by using a blow machine with a sizing unit which comprises at least one blow mandrel having a cutting sleeve, and a blow mandrel holder comprising a sleeve part and a flange part whereby the sleeve adjustably secures the holder from axial movement and the flange adjustably secures the holder from radial movement.

Using a blow mandrel holder as a sleeve with an integrally attached flange, the setup operation may be carried out essentially automatically. Mandrels and loosened holders are lowered onto the sizing plates. The mandrel height adjustment is obtained by the cutting edges of the cutting sleeves coming to rest in the sizing plate openings. The transverse mandrel setting in the setting plane is attained by tapered blow mandrels aligning with the openings of the sizing plates. The settings thus take place automatically both in height and in the transverse direction, whereupon one merely secures the holder for the mandrel.

In a convenient embodiment, part of the sleeve is in the form of a guide and another part constitutes a clamping sleeve. The blow mandrel is guided precisely in the axial direction and may be secured in proper position by the clamping sleeve.

Preferably, the blow mandrel holder is fastened in the setting plane on the blow mandrel holder by a clamping ring. The ring is preferably loaded by an axially acting compression spring, thus forcing the flange to remain exactly in the setting plane. This spring also assures that no tilting can occur during the automatic setting of the blow mandrel.

To improve the setting of the blow mandrel in the axial direction, a stop ring may be provided. This allows the blow mandrel cutting sleeve edge to be pressed securely into the opening of the sizing plate to the limits of the stop ring. This helps to achieve a particularly precise automatic adjustment of one or more blow mandrels in a carrier.

BRIEF DESCRIPTION OF THE DRAWINGS

One form of embodiment of the invention is explained below in more detail with reference to the drawing, wherein:

FIG. 4 is a section through a sizing unit carrying two blow mandrels on the line IV—IV in FIG. 5;

FIG. 5 is a sectional view through the sizing unit according to section line V—V in FIG. 4.

DESCRIPTION OF THE PREFERRED EMBODIMENT

Figure 1:
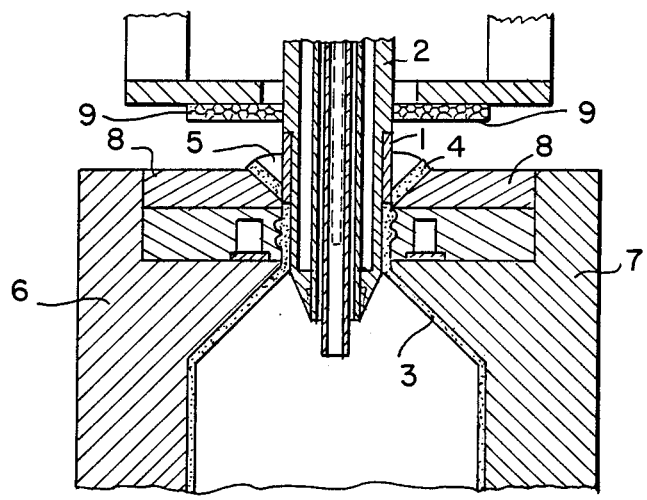
FIG. 1 shows an axial section through the tip of a blow mandrel equipped with a cutting sleeve in the sizing position and within the opening of a sizing plate.

FIG. 1 shows the tip of a blow mandrel 2 equipped with a cutting sleeve 1 and located in the sizing position within the neck opening of a bottle 3. The neck roundel 4 of bottle neck 3 is cut by cutting sleeve 1 having an edge resting against the conical wall of opening 5 formed in the sizing plate 8. Plate 8 is fastened to tool halves 6 and 7. The blow mandrel 2 passes through a stripper plate 9 whereby the neck roundel 4 is stripped while raising the blow mandrel from the bottle neck 3 and opening 5.

Figure 2:
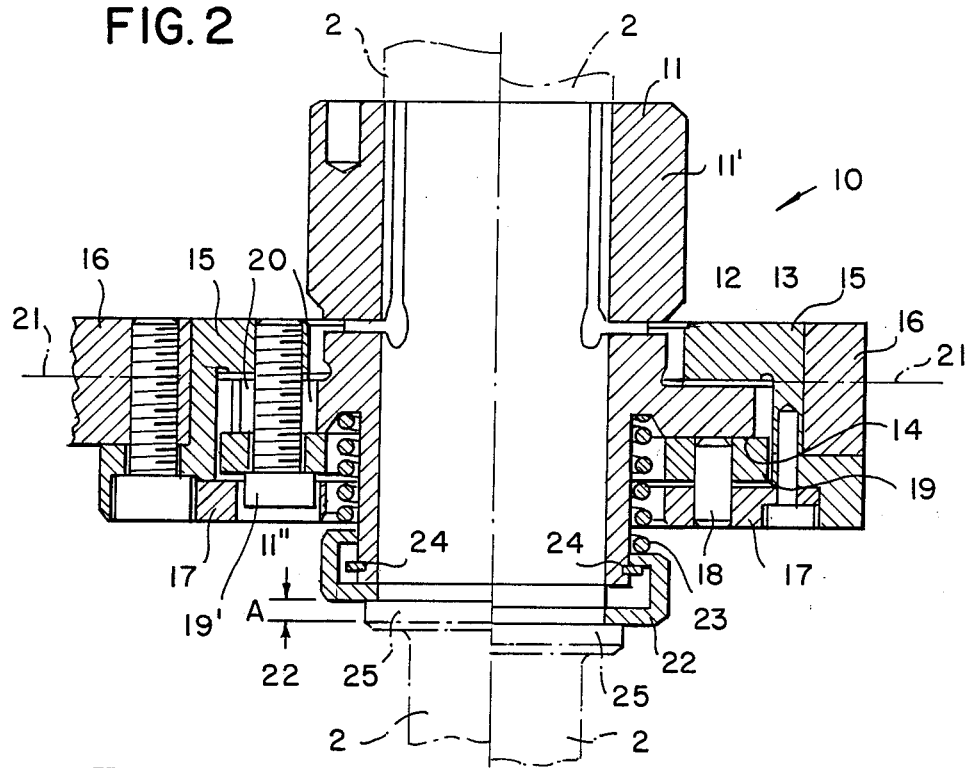
FIG. 2 is an axial section showing two positions of an embodiment of a blow mandrel holder according to an embodiment of the invention.
Figure 3:
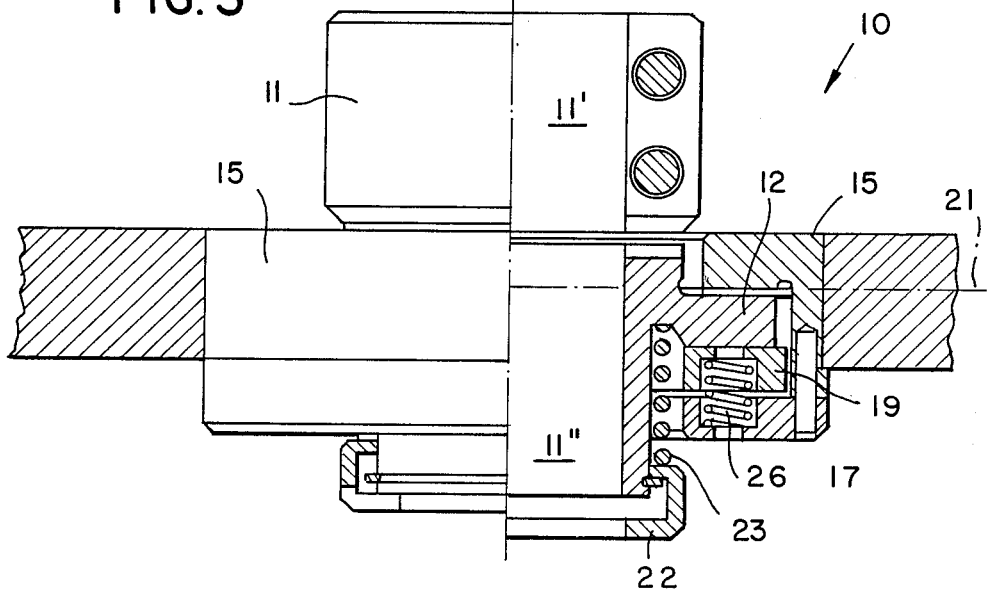
FIG. 3 is a semi-section through the blow mandrel holder shown in FIG. 2, but in a different cutting angle representing the layout of a compression spring.

FIG. 2 shows a blow mandrel holder 10 as an integral combination of sleeve part 11 and flange part 12. Sleeve 11 is designed as a clamping sleeve 11' and as a guide sleeve 11". Flange 12 comprises an upper annular disk surface 13 and a lower annular disk surface 14. With its upper annular surface 13, flange 12 abuts against a modular ring 15. A gasket for increasing friction between surface 13 and ring 15 may be inserted. Modular ring 15 is fastened in blow mandrel holder 16.

A retainer ring 17 is mounted in modular ring 15 with a plurality of guide pins 18. Pins 18 are securely anchored in retainer ring 17. Pins 18 also pass through a clamping ring 19 such that clamping ring 19 is freely displaceable in the axial direction and fixedly connected to retainer ring 17 for rotation.

Clamping ring 19 is pressed by screws 19' against the lower annular disk surface 14. Screws 19' are screwed into modular ring 15 and pass through flange 12 in openings 20. In loosened state, screws 19' make radial displacement of flange part 12 in setting plane 21 possible.

A stop ring 22 is provided on the lower end of sleeve part 11 and is exposed to the action of an axial spring 23 supported in sleeve part 11. Stop ring 22 may be displaced over an axial tolerance distance A. The axial motion is limited by the abutment of stop ring 22 against the lower edge of the sleeve and by a stop 24 located in sleeve part 11.

In the left half of FIG. 2, blow mandrel 2 is shown by dash-and-dot lines with stop ring 22 (resting on the annular shoulder 25 of the blow mandrel 2) abutting against the lower edge of sleeve part 11.

In the right half of FIG. 2, stop ring 22 is resting on stop 24. Note the axial displacement distance A between the bottom of flange part 12 and blow mandrel 2. 26 is supported at one end in the retainer ring 17 and abuts its other end against clamping ring 19. If the screws 19' are loose, clamping ring 19 is pushed against flange 12 with a compressive force which permits a slight radial mobility in blow mandrel holder 10 in setting plane 21 and relative to the blow mandrel carrier and modular ring 15. The pressure and positioning of spring 26 insure that blow mandrel holder 10 does not tilt during the automatic centering of mandrel 2 on opening 5 in sizing plate 8 (FIG. 1).

FIGS. 4 and 5 show a sizing unit 27 carrying two blow mandrels 2. Blow mandrel carrier 16 is shown as a blow mandrel cassette which replaceably fastens to the vertically moving sizing unit 7 using a dovetail guide 28. Blow mandrels 2 are held in blow mandrel holders 10 and are replaceably fastened to blow mandrel carrier 16 or the blow mandrel cassette by modular ring 15.

Protruding from blow mandrel holder 10 is connecting head 29 which connects with compressed air and cooling water lines (not shown).

Holding rods 32 of stripper plate holder 4 are supported in an axially displaceable manner by upper and lower bearings 30 and 31, respectively. These bearings are sufficient for bearing the attachment load due to the weight and movement forces associated with blow mandrel carrier 16. Holding rods 32 carry stripper plates 33 in holder 34 (note stripper plate 9 of FIG. 1) in the form of an annular disk 25. Rods 32 guide plate 33 in a plane perpendicular to the blow mandrel axis 2' but permit free movement in holder 34.

Figure 6:
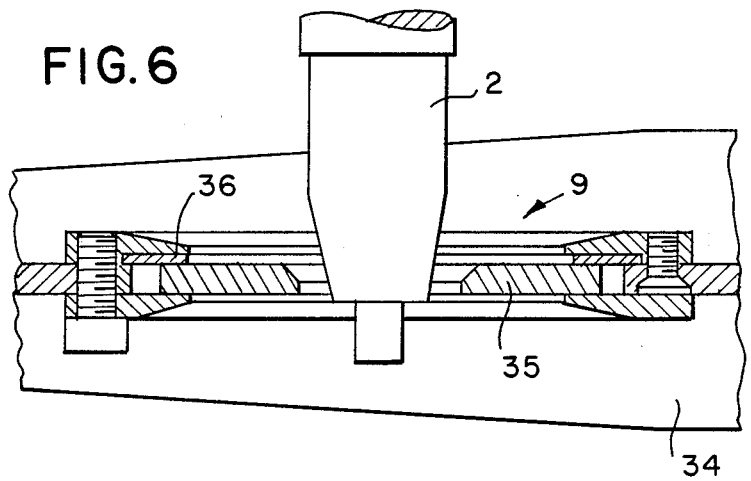
FIG. 6 is a detail view of the stripper blade according to FIGS. 4 and 5.

As seen in the more detailed view of FIG. 6, annular disk 35 is pressured against holder 34 by a plate spring 36. Annular disk 35 thus occupies an annular position after the initial centering penetration of the blow mandrel tip and during subsequent working steps.

Returning to FIGS. 4 and 5, stop ring 37 is mounted on each of the holding rods 32 between bearings 30 and 31. Compression spring 38 is between lower bearing 31 and stop ring 37 so that holding rods 32 are pressed upward relative to blow mandrel carrier 16 until the ends 39 of holding rods 32, rest against stop points 40 fixedly mounted on the machine frame.

Sizing plates 8 on tool halves 6 and 7 are arranged below blow mandrel 2. Opening axes 5' in sizing plates 8 are shown out of alignment with mandrel axes 2'. This positioning represents the unadjusted starting situation for a blow molding process.

To properly center the mandrels 2 on openings 5 in a radial plane 21 perpendicular to mandrel axes 2', screws 19' are first loosened. Mandrel holder 10 freely displaces radially in ring 15 yet flange 12 remains properly in plane 21. Sizing unit 27 is lowered so that mandrels 2 enter openings 5 in the sizing plate 8. Although blow mandrels 2 are offset relative to opening axes 5', the conical configurations of the blow mandrel tips and the openings 5 automatically center the blow mandrel holders 10. Holders 10 radially displace modular ring 15 while remaining in setting plane 21 until the mandrel axes 2' are exactly aligned with the opening axes 5'. Tightening screws 19 secures blow mandrels 2 in this radially centered position.

When openings 5 are at different levels, blow mandrels 2 must be axially adjusted. Clamping sleeve 11' is loosened so that blow mandrel 2 is freely displaceable as guided by sleeve 11'. Upon the lowering of the sizing unit 27, the first blow mandrel 2 comes to rest on the highest opening 5. The blow mandrel 2 will rest its annular shoulder 25 on stop ring 22 as shown in the right half of FIG. 2. As sizing unit 27 continues to lower, blow mandrel 2 is displaced by tolerance distance A against axial spring 23 until stop ring 22 rests against the lower edge of sleeve part 11 (left half of FIG. 2). In this position, blow mandrel 2 is axially secured by tightening clamping sleeve part 11'. The tolerance distance A is dimensioned so that it is wider than the greatest level difference among openings 5 in sizing plates 8. In this way, after the first stop ring 22 touches the lower end of sleeve part 11, the other blow mandrels 2 are in position and may be secured by their respective clamping sleeves 11'.

According to the scope of the invention, at least the following modifications are foreseen:
modifying the blow mandrels 2 within sleeve parts 11;
modifying the blow mandrels 2, mandrel holders 10, and modular rings 15; and
modifying the blow mandrels 2 and blow mandrel cassettes.

The blow mandrel cassettes may carry one or several blow mandrels. The blow mandrel cassettes may be of different types or numbers and mounted on dovetail guide 28 of sizing unit 27.

I claim:
1. A process for operating a blow molding sizing unit, wherein said sizing unit comprises:
   at least one blow mandrel; and
   at least one blow mandrel holder comprising:
   a sleeve connected to said mandrel by means for adjustably securing said mandrel in an axial direction;
   a flange connected to said mandrel by means for adjustably securing said mandrel in a radial direction; and
   a blow mandrel carrier attached to said sizing unit and detachably connected to said at least one blow mandrel holder
   wherein said process comprises:
   lowering said at least one blow mandrel connected to a blow mandrel holder having radial and axial motion onto a sizing plate having at least one opening wherein radial positioning is automatically accomplished upon lowering said at least one blow mandrel by tapered geometry of said at least one blow mandrel aligning with the sizing plate opening; and
   tightening said sleeve, said flange, or both in either order for restraining axial and/or radial motion of said at least one blow mandrel.

2. A process according to claim 1 wherein said at least one blow mandrel is maintained in proper setting plane orientation during said lowering by an axially loaded spring connected to said flange.

3. A process according to claim 1 wherein maximum axial movement of said at least one blow mandrel is restrained by a stop ring displaceably communicating with at least one blow mandrel holder.

4. A process according to claim 3 wherein said stop ring is annular to the holder and comprises abutment surfaces for communication with abutment surfaces of the blow mandrel holder.

* * * * *